(12) United States Patent
Scherer et al.

(10) Patent No.: US 6,948,967 B2
(45) Date of Patent: Sep. 27, 2005

(54) RETAINING RAIL FOR FIXING A SLIDE-IN MODULE IN A MOUNTING CRADLE OF A COMPUTER

(75) Inventors: August Scherer, Dinkelscherben (DE); Wilhelm Neukam, Bobingen (DE)

(73) Assignee: Fujitsu Siemens Computers GmbH, Munich (DE)

( * ) Notice: Subject to any disclaimer, the term of this patent is extended or adjusted under 35 U.S.C. 154(b) by 0 days.

(21) Appl. No.: 10/673,706

(22) Filed: Sep. 26, 2003

(65) Prior Publication Data

US 2004/0070930 A1 Apr. 15, 2004

(30) Foreign Application Priority Data

Sep. 26, 2002  (DE) .......................................... 102 44 887

(51) Int. Cl.⁷ ................................................. G06F 1/16
(52) U.S. Cl. ...................................... 439/377; 361/727
(58) Field of Search ............................... 439/374, 377; 361/727, 685, 802, 741, 756

(56) References Cited

U.S. PATENT DOCUMENTS 5,142,447 A  *  8/1992  Cooke et al. ............... 361/685
5,595,501 A       1/1997  Ho
5,653,518 A       8/1997  Hardt
6,025,987 A  *  2/2000  Allirot et al. ............... 361/685
6,247,944 B1     6/2001  Bolognia et al.
6,304,457 B1    10/2001  Liu et al.
6,339,532 B1     1/2002  Boulay et al.
6,396,686 B1  *  5/2002  Liu et al. .................... 361/685
6,469,889 B1  * 10/2002  Gan .......................... 361/685

FOREIGN PATENT DOCUMENTS

EP  0 834 880 A1  4/1998
EP  0 965 992 A1  12/1999

* cited by examiner

Primary Examiner—Neil Abrams
(74) Attorney, Agent, or Firm—Laurence A. Greenberg; Werner H. Stemer; Ralph E. Locher

(57) ABSTRACT

Retaining rails with which a slide-in module can be fixed in a mounting cradle. It being possible for the retaining rails to be attached laterally to the slide-in module. Accordingly, the retaining rails are characterized in that they have a plastic element and a metal element. The metal element encloses at least certain portions of the plastic element, and in that the metal element has resilient retaining elements for interaction with guiding elements of the mounting cradle and in that the plastic element has resilient portions for establishing lateral tolerance compensation with respect to the sidewalls of the mounting cradle.

9 Claims, 2 Drawing Sheets

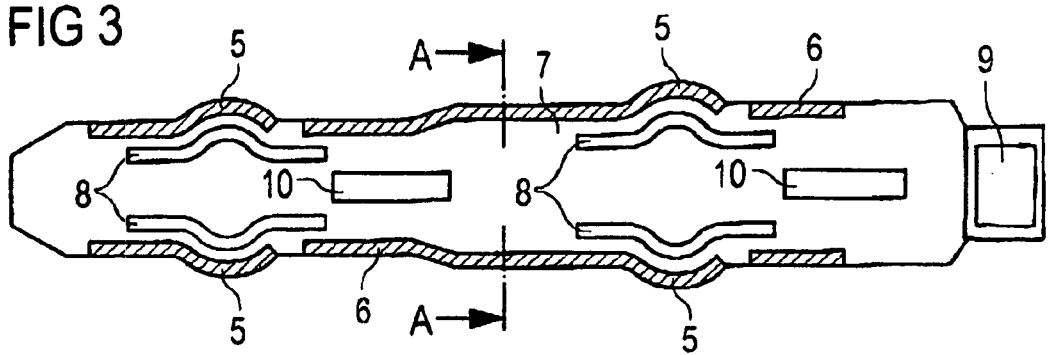
FIG 3
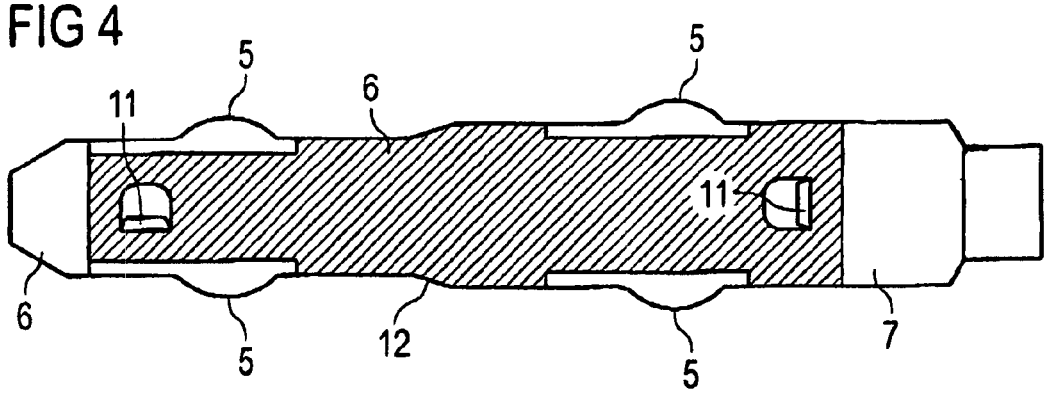
FIG 4
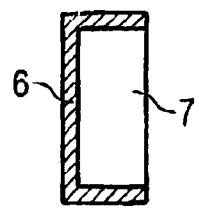
FIG 5  A-A ing cradle;

RETAINING RAIL FOR FIXING A SLIDE-IN MODULE IN A MOUNTING CRADLE OF A COMPUTER

BACKGROUND OF THE INVENTION

FIELD OF THE INVENTION

The invention relates to a retaining rail for fixing a slide-in module in a mounting cradle of a computer that can be attached laterally to the slide-in module.

In the case of slide-in modules, it is always endeavored to fix them in the mounting cradle without the use of screws. Retaining rails provided for this purpose are known for example from Published, European Patent Application EP 0 834 880 A1, corresponding to U.S. Pat. No. 6,025,987. The retaining rails used there are attached to the slide-in module and fastened together with the latter in the mounting cradle. However, the known retaining rails are relatively complex and the horizontal and vertical tolerance compensation is not optimal.

It is a problem that the mounting cradles have relatively great tolerances and mounted slide-in modules therefore have certain clearances vertically and horizontally. In many cases, such fastening of the slide-in module in a mounting cradle is not adequate. During operation of the slide-in module, vibrations then cause problems that disrupt satisfactory operation of the slide-in module. In particular in the case of CD-ROM drives, which operate at very high speed and at the same time are often used with CD-ROMs which are unbalanced, inadequate fastening in the mounting cradle leads to considerable noise nuisance.

The screwing of the slide-in modules onto the mounting cradle recommended by the manufacturers of the slide-in modules is uneconomical and not customer-friendly, since time and tools are required to screw them on. On the other hand, screws falling out in the computer may cause short-circuits and other problems.

SUMMARY OF THE INVENTION

It is accordingly an object of the invention to provide a retaining rail for fixing a slide-in module in a mounting cradle of a computer that overcomes the above-mentioned disadvantages of the prior art devices of this general type, which can be attached to the slide-in module in such a way that secure fastening in the mounting cradle is ensured and simple mounting is nevertheless possible. At the same time, the mounting of heavy slide-in modules, which requires increased stability for the fastening, is to be possible in particular.

With the foregoing and other objects in view there is provided, in accordance with the invention, a retaining rail for fixing a slide-in module in a mounting cradle of a computer and can be attached laterally to the slide-in module. The retaining rail contains a plastic element having resilient portions for establishing lateral tolerance compensation with respect to side walls of the mounting cradle, and a metal element enclosing at least certain portions of the plastic element. The metal element has resilient retaining elements for interacting with guiding elements of the mounting cradle.

The object is achieved by the retaining rail of the type stated at the beginning which is characterized in that the retaining rail has a plastic element and a metal element. The metal element encloses at least certain portions of the plastic element, and the metal element has resilient retaining elements for interaction with the guiding elements of the mounting cradle. The plastic element has resilient portions for establishing lateral tolerance compensation with respect to the side walls of the mounting cradle.

The retaining rail according to the invention is a particularly advantageous combination of metal and plastic elements. The resilient retaining elements of the metal element achieve the effect of vertical fixing, absorbing even the high forces caused by heavy slide-in modules. In addition, the metal element provides a reliable electrical ground connection for the slide-in module. The plastic element allows optimal resilient properties to be established for the lateral tolerance compensation.

In a particularly advantageous configuration, resilient underlay elements made of plastic are provided underneath the resilient retaining elements of the metal element on the plastic element and prevent the resilient retaining elements from being bent under strong mechanical loading and after that no longer ensuring a snug fit.

Furthermore, it is advantageous that the metal element has four resilient metal elements for interacting with guiding elements of a mounting cradle, so that all the fastening points of the slide-in module can be configured in a resilient manner.

In a preferred embodiment, a graduation is provided, the first end to be pushed in of the retaining rail has a lower height than the other end of the retaining rail. This obtains the effect that less force has to be expended for sliding in and the four resilient retaining elements fix the retaining rail with respect to the guiding elements of the mounting cradle only at the last moment.

Furthermore, it is advantageous if vertical and horizontal metal studs which can be inserted into corresponding holes of a slide-in module and bring about positional centering in height and in depth are provided on the metal element. The studs may be bent directly out of the metal element or be realized by riveted-in metal studs.

In accordance with an added feature of the invention, the plastic element has a latching element for latching the retaining rail in mating latching elements of the mounting cradle.

Other features which are considered as characteristic for the invention are set forth in the appended claims.

Although the invention is illustrated and described herein as embodied in a retaining rail for fixing a slide-in module in a mounting cradle of a computer, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a first side-elevational view of an outer side of a retaining rail according to the invention;

FIG. 4 is a second side-elevational view of the inner side of the retaining rail from FIG. 3; and FIG. 5 is a cross-sectional view through the retaining rail from FIGS. 3 and 4 taken along the line V—V.

DESCRIPTION OF THE PREFERRED EMBODIMENTS

Figure 1:
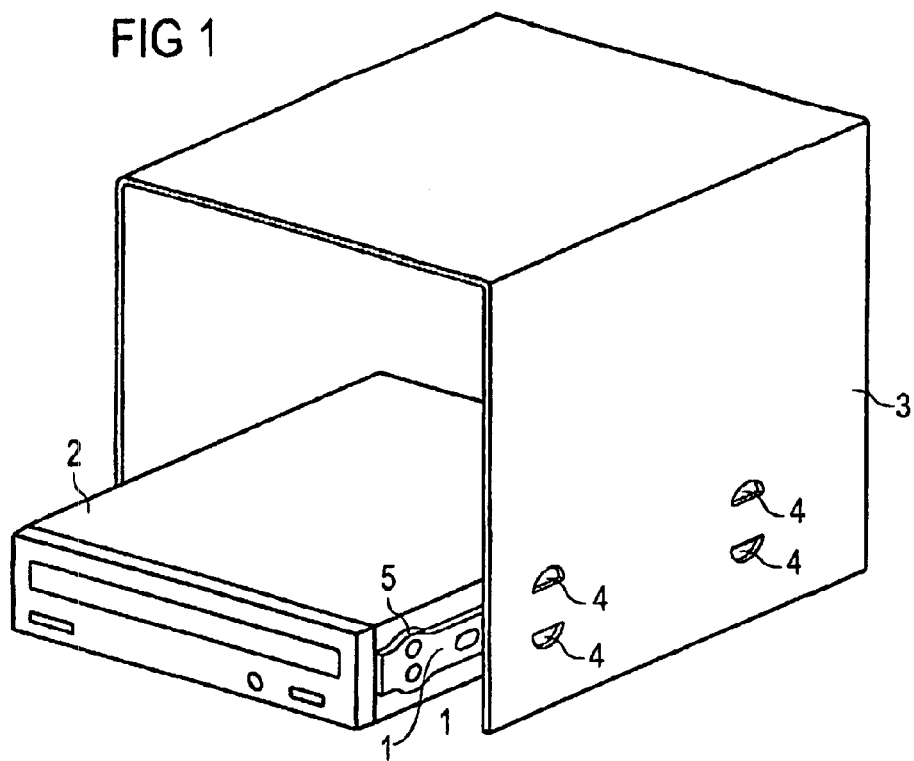
FIG. 1 is a diagrammatic, perspective view in which a slide-in module with a retaining rail according to the invention is fastened in a mounting cradle.

Referring now to the figures of the drawing in detail and first, particularly, to FIG. 1 thereof, there is shown a slide-in module 2, in this case a CD-ROM drive, which is fixed in a mounting cradle 3 of a computer with the aid of retaining rails 1.

The mounting cradle 3 has tabs 4, which are punched out from the side wall of the mounting cradle 3 and bent away perpendicularly, so that they form guiding elements 4 for the retaining rail 1. In a modified embodiment, riveted-in studs are provided as the guiding elements 4. The retaining rail 1 is provided with resilient retaining elements 5, which in the completely slid-in state interact with the guiding elements 4 of the mounting cradle 3.

Figure 2:
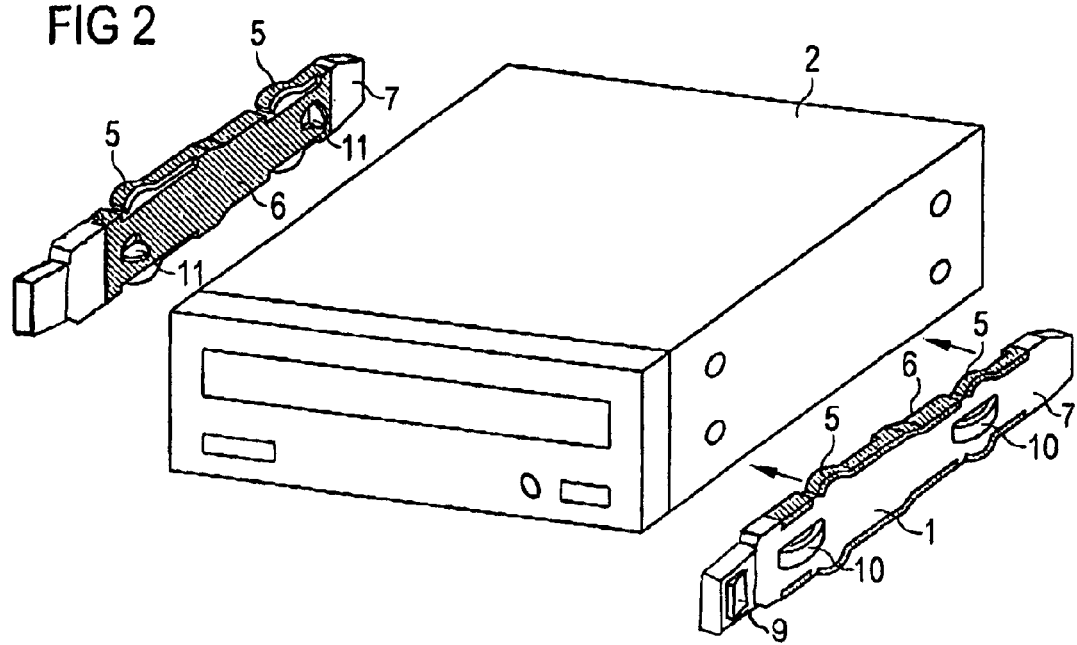
FIG. 2 is a perspective view showing the fastening of two retaining rails on a slide-in module.

Shown in FIG. 2 is the CD-ROM drive from FIG. 1 and the retaining rails 1, it being possible to see the retaining rails 1 in more detail. They contain a plastic element 7 and a metal element 6, the metal element 6 enclosing parts of the plastic element 7. The resilient retaining elements 5 are relatively rigid and adapted to the high weight of the CD-ROM drive. Additionally formed on the metal element 6 are studs 11, which can be inserted into corresponding holes of the CD-ROM drive 2, so that the metal element 6 is fixed onto the CD-ROM drive. In this way, the CD-ROM drive is securely fastened vertically. In this manner, it is possible to effectively compensate for tolerances, it nevertheless been ensured that any impact loads are lessened by the resilient retaining elements 5. In the exemplary embodiment shown, the studs 11 are realized as bent-away tabs. As an alternative, riveted-in studs can also be used.

However, the metal element 6 alone does not provide any lateral tolerance compensation. Serving for this purpose is the plastic element 7, which has on the side facing away from the CD-ROM drive resilient portions 10, which in the mounted state press against the side wall of the mounting cradle 3 and can consequently compensate for any tolerance. The resilience toward the side must in this case be much more flexible than in the vertical direction, since the CD-ROM drive 2 does not press with its weight on the resilient portions 10. Here, the combination of the retaining rail 1 containing the plastic 7 element in the metal element 6 is of advantage in particular, since an element just of metal only allows very different resilient properties to be adjusted very poorly and with great effort.

In FIG. 3, the retaining rail 1 is shown in a side view, the side facing away from the CD-ROM drive 2 being illustrated. In this representation, it can additionally be seen that plastic underlays 8 are provided, preventing the resilient retaining elements 5 from being over bent under mechanical loading and after that no longer ensuring a snug fit. The plastic underlay 8 similarly has resilient properties.

In FIG. 4, the retaining rail 1 from FIG. 2 can be seen from the other side, where it is consequently in contact with the CD-ROM drive 2 or some other slide-in module. Of the two studs 11 which can be inserted into holes of the CD-ROM drive 2 and are formed as tabs 11 which are bent out from the metal elements 6, one is horizontally aligned while the other is vertically aligned. Alternatively provided riveted-in studs would be positioned correspondingly. The horizontally aligned tab 11 obtains the effect of perfect positional centering in depth, while the vertically aligned tab 11 provides positional centering in height.

Also provided is a latching element 9, which can latch with a suitable mating latching element of the mounting cradle 3 and consequently prevents the slide-in module 2 from sliding out of the mounting cradle 3.

The retaining rails 1 are configured in such a way that the height is less in a front region, in the sliding-in direction, than in a rear region, which is achieved by a graduation between these regions. On account of this configuration, a slide-in module with retaining rails 1 fastened to it can be introduced into the mounting cradle 3 with very little expenditure of force and the resilient retaining elements 5 come into contact with the guiding elements 4 only just before the final position is reached. Further expenditure of force in the sliding-in direction has the effect that the resilient retaining elements 5 are pressed together and consequently ensure a secure fit, even if the movement tolerances of the mounting cradle 3 are very great. Since the resilient portions of the plastic element 7 are much more flexible than the resilient retaining elements 5, no graduation is necessary in the horizontal direction. Resistance encountered by the user during sliding-in on account of the resilient properties of the resilient portions 10 is relatively small.

FIG. 5 shows a cross section through the retaining rail 1 of FIGS. 3 and 4. It can be seen in this section that the metal element 6 has the form of a U, which encloses the plastic element 7 from three sides in this region.

Instead of using bent-away tabs of the mounting cradle 3 as the guiding elements, special guiding rails which are connected to the side walls of the mounting cradle 3 may also be used.

We claim:

1. A retaining rail for fixing a slide-in module in a mounting cradle of a computer and can be attached laterally to the slide-in module, the retaining rail comprising:
   a plastic element having resilient portions for establishing lateral tolerance compensation with respect to side walls of the mounting cradle; and
   a metal element enclosing at least certain portions of said plastic element, said metal element having resilient retaining elements for interacting with guiding elements of the mounting cradle.

2. The retaining rail according to claim 1, further comprising resilient underlay elements formed of plastic and disposed underneath said resilient retaining elements on said plastic element.

3. The retaining rail according to claim 1, wherein said metal element and said plastic element define a first end and a second end, said first end to be pushed in the mounting cradle first having a lower height than said second end.

4. The retaining rail according to claim 1, wherein said metal element has four of said resilient retaining elements for interaction with the guiding elements of the mounting cradle.

5. The retaining rail according to claim 1, wherein the slide-in module has holes formed therein, and said metal element has studs formed thereon for insertion into the holes of the slide-in module.

6. The retaining rail according to claim 5, wherein said studs are tabs, one of said tabs being formed horizontally and another of said tabs being formed vertically.

7. The retaining rail according to claim 6, wherein said tabs are riveted in.

8. The retaining rail according to claim 1, wherein said plastic element has a latching element for latching the retaining rail in mating latching elements of the mounting cradle.

9. A configuration, comprising:
   a mounting cradle having sidewalls and guiding elements;
   a slide-in module; and retaining rails fixing said slide-in module in said mounting cradle, said retaining rails containing a plastic element having resilient portions for establishing lateral tolerance compensation with respect to said side walls of said mounting cradle and a metal element enclosing at least certain portions of said plastic element, said metal element having resilient retaining elements interacting with said guiding elements of said mounting cradle.

* * * * *